(No Model.)

W. LANGDON.
Spirit Level.

No. 232,982. Patented Oct. 5, 1880.

WITNESSES:
A. Schehl.
C. Sedgwick

INVENTOR:
W. Langdon
BY Munn & Co.
ATTORNEYS.

UNITED STATES PATENT OFFICE.

WILLIAM LANGDON, OF UPLAND, PENNSYLVANIA.

SPIRIT-LEVEL.

SPECIFICATION forming part of Letters Patent No. 232,982, dated October 5, 1880.

Application filed May 14, 1880. (No model.)

*To all whom it may concern:*

Be it known that I, WILLIAM LANGDON, of Upland, in the county of Delaware and State of Pennsylvania, have invented a new and useful Improvement in Spirit-Levels, of which the following is a specification.

My invention consists in a novel construction and peculiar form of the body or stock of the instrument, and in the combination therewith, and peculiar arrangement with relation thereto, of a number of spirit-tubes, whereby provision is made for using the instrument in various positions.

Figure 1:
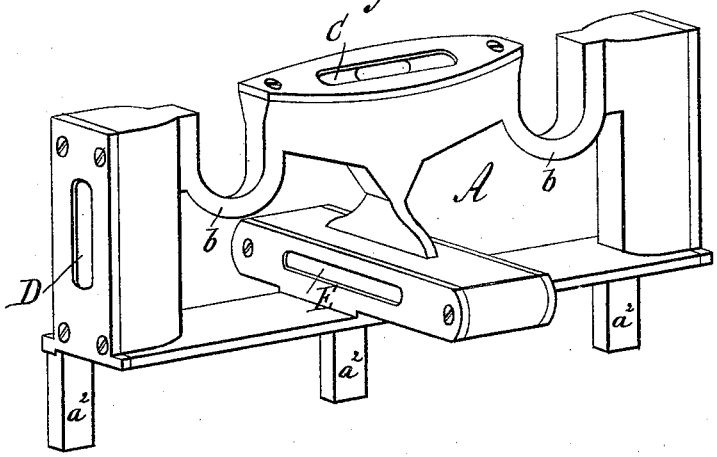
Figure 2:
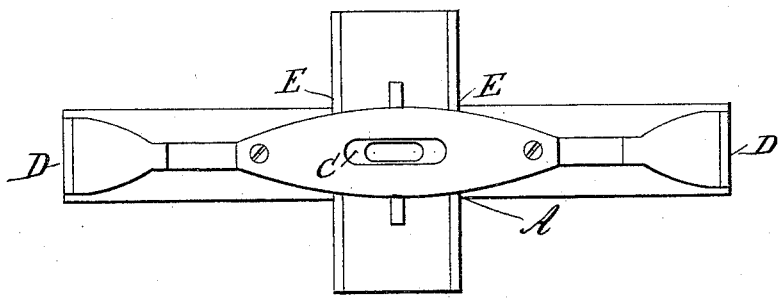
Figure 3:
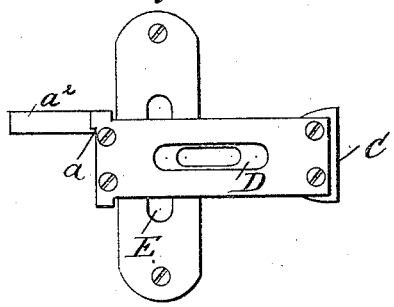

In the accompanying drawings, Figure 1 represents a perspective view, Fig. 2 a top view, and Fig. 3 an end view, of an instrument embodying my improvements.

A represents the frame, body, or stock, which may be cast in one piece of metal. It is provided with recesses for spirit-tubes, arranged in three different directions with relation to each other, and said recesses and tubes are covered by slotted plates in the usual manner.

The bottom of the frame A extends the entire length, and has formed on it a flange, $a'$, and lugs $a^2$, at an exact right angle with the plane of said bottom.

The top of the frame is exactly parallel with the bottom, and is provided with a recess and covering-plate inclosing a spirit-tube, C.

The two ends of the frame are exactly perpendicular to the top and bottom, and are provided with recesses and covering-plates inclosing spirit-tubes D D. Each of these end portions connects at one end thereof directly with the bottom portion, and at the other end a curved brace, $b$, connects it with the top portion, which carries the tube C, said top portion being shorter than the bottom portion.

Between the top and bottom, and midway between the two ends, is a casing containing two recesses and covering-plates inclosing two spirit-tubes, E E, arranged transversely of the frame and exactly at right angles with the length thereof and with the tube C, and also at right angles with the tubes D D.

By the construction and arrangement above described the instrument may be used in various positions, in each of which it will indicate both level and plumb.

When used in the position shown in Fig. 1 the tube C is horizontal and parallel with the length of the frame. The tubes E E are also horizontal, but they lie transversely of the length of the frame, and the tubes D D are vertical and at right angles with the tube C in one direction and the tubes D in another direction. In this position the tubes C and E E indicate both the level and the plumb. When used in the position shown in Fig. 2 the tubes C and D D indicate both the level and the plumb. When used with the ends horizontal and the top and bottom vertical, the tubes D D and E E indicate both the level and the plumb.

The flange $a$ and lugs $a^2$ provide a convenient means for applying the instrument to a corner, either horizontal or vertical, in order to indicate at once both a level and a plumb surface in one position, or two plumb surfaces in the other position.

Having thus fully described my invention, I claim as new and desire to secure by Letters Patent—

1. A spirit-level stock consisting of an oblong bottom supporting a slotted vertical tube, D, at each end, a transverse horizontal slotted tube, E, in the middle, and a superposed median horizontal slotted tube, C, over and at right angles to tube E, said tube C being connected at the sides and bottom, respectively, with tubes D and E, as shown and described.

2. In a plumb and level indicator, a frame or stock, A, provided with a flange, $a$, and lugs $a^2$, as herein shown and described, for the purpose specified.

Witnesses:      WILLIAM LANGDON.
  HENRY ROWE,
  BENJAMIN W. CLARKE.